(No Model.)

A. W. BROWNE.
PULLEY BLOCK.

No. 519,984. Patented May 15, 1894.

WITNESSES:

INVENTOR

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

PULLEY-BLOCK.

SPECIFICATION forming part of Letters Patent No. 519,984, dated May 15, 1894.

Original application filed April 17, 1893, Serial No. 470,774. Divided and this application filed February 5, 1894. Serial No. 499,048. (No model.)

*To all whom it may concern:*

Be it known that I, ARTHUR W. BROWNE, a citizen of the United States, residing at Prince's Bay, in the county of Richmond and State of New York, have invented certain new and useful Improvements in Pulley-Blocks; and I do hereby declare the following to be a full, clear, and exact description of the invention, such as will enable others skilled in the art to which it appertains to make and use the same.

My invention relates to certain improvements, as hereinafter claimed, in pulley blocks applicable to use in connection with suspension dental engines. In my Patent No. 515,816, patented March 6, 1894, Serial No. 470,774, of which my present improvements constitute a division, is shown a dental engine of the class in connection with which the improved pulley blocks are especially designed to be used, although they may obviously be used in connection with other mechanism employing a driving cord.

Figure 1:
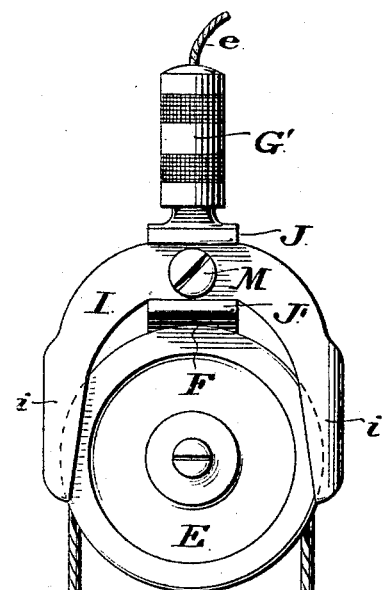
Figure 2:
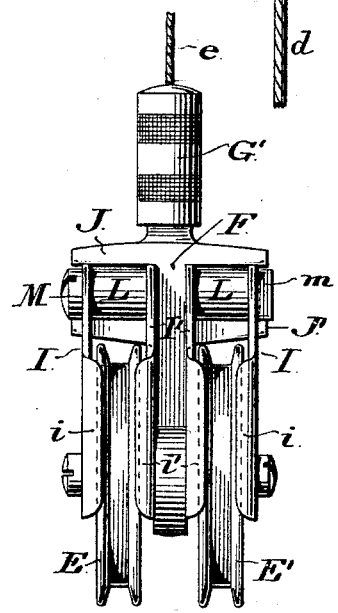
Figure 3:
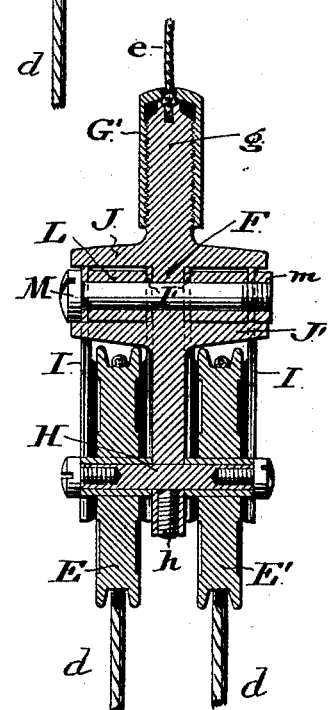

In the accompanying drawings Figure 1 is a view in elevation; Fig. 2 an elevation at a right angle with Fig. 1; and Fig. 3 a vertical central section of the improved pulley block.

A driving cord $d$ to which motion is imparted in suitable way, passes about pulleys E E' of the pulley block, the frame F of which is suspended by a cord $e$ from an appropriate support. From the suspension pulley block the driving cord passes to a driven pulley for imparting rotary motion to the tool or device to be actuated, as will be understood by reference to my above mentioned patent and needs no explanation here. The suspension cord $e$ is attached to the frame of the pulley block by means of a threaded sleeve G', through a hole in the end of which the cord is passed and then knotted. This sleeve is screwed on the stud $g$ of the pulley block frame. See Fig. 3. The pulleys E E' are mounted to rotate about the shaft H secured to the pulley block frame by the set screw $h$. The pulleys E E' are similarly provided with inner and outer cord-guards. The outer cord-guard I and the inner cord-guard I' (for either pulley), as shown, are of U-shape, are made of thin metal, and secured between cross arms J J' of the pulley block frame. A spacing sleeve L is interposed between the inner and outer guard for each pulley, and a through bolt M and nut $m$ serve to secure the guards in place. The depending arms or forks of each outer guard are provided with flanges $i\ i$ projecting inwardly so as to come opposite to or slightly overlap the outer flange of the adjacent pulley, between which and the guard arms but slight space is left. The depending forks of each inner guard are provided with flanges $i'\ i'$ similar to those of the outer guards, except that the flanges project outwardly to cause them to occupy proper positions relatively to the inner flanges of the pulleys such as occupied by the outer guard arms relatively to the outer flanges. The arms of the guards are sufficiently yielding to spring slightly under proper pressure. From the above description it will be seen that the driving cord can be readily engaged with the pulleys E E' by passing it inside of the outer guard arms which yield to permit of the passage of the cord, and that when the cord is so placed in position it may be drawn at any desired angle without displacing it from the pulleys.

I claim as my invention—

1. The combination, in a suspension pulley block, of the frame, the pulleys, and the cord guards secured to the frame and provided with the depending yielding forks having the flanges adjacent to the flanges of the pulleys, substantially as and for the purpose set forth.

2. The suspension pulley block having the frame provided with the cross arms, the pulleys, the forked cord-guards secured between the cross arms of the frame, the spacing sleeves, the securing bolt, and its nut, substantially as and for the purpose set forth.

In testimony whereof I affix my signature in presence of two witnesses.

ARTHUR W. BROWNE.

Witnesses:
   ELI T. STARR,
   E. EUGENE STARR.